Patented Jan. 26, 1954

2,667,411

UNITED STATES PATENT OFFICE 2,667,411

DERIVATIVES OF BENZYLIDENECYANO-ACETIC ACID

David T. Mowry and Arthur H. Schlesinger, Dayton, Ohio, assignors to Monsanto Chemical Company, St. Louis, Mo., a corporation of Delaware No Drawing. Application March 22, 1951, Serial No. 217,063

16 Claims. (Cl. 71—2.6)

This invention relates to new derivatives of benzylidenecyanoacetic acid. More particularly the invention provides allyl esters of benzylidenecyanoacetic acids and herbicidal compositions containing the allyl esters.

The new derivatives of benzylidene cyanoacetic acid may be represented by the general formula

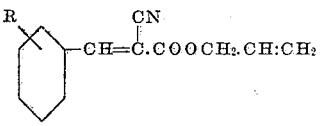

in which R is selected from the class consisting of hydrogen and alkyl radicals of from 1 to 4 carbon atoms. As examples of compounds having the above general formula may be mentioned allyl benzylidenecyanoacetate, allyl 2-methylbenzylidenecyanoacetate, allyl 3-ethylbenzylidenecyanoacetate, allyl 4-isopropylbenzylidenecyanoacetate, allyl 3-n-butylbenzylidenecyanoacetate, etc. Allyl benzylidenecyanoacetate and ar-alkyl derivatives thereof having the above general formula are obtained by contacting allyl cyanoacetate with benzaldehyde or benzaldehyde having one nuclear hydrogen substituted by an alkyl radical of from 1 to 4 carbon atoms, e. g., 2-tolualdehyde, 4-ethylbenzaldehyde, 4-n-propylbenzaldehyde or 3-isobutylbenzaldehyde, at ordinary or increased temperature and allowing the resulting mixture to stand for a time varying from several hours to several days until formation of the benzylidene compound. While condensation of the aldehyde with the allyl cyanoacetate to yield the present products proceeds in absence of a condensing agent, it is advantageous to employ a basically reacting material as catalyst. Useful catalysts are inorganic or organic basically reacting materials, e. g., inorganic bases or salts thereof such as sodium hydroxide, potassium hydroxide, sodium carbonate, potassium acetate and organic bases such as ethanolamine, pyridine, etc. Inert diluents or solvents may be also advantageously employed, the use of such materials serving to effect smooth reaction by mitigating reaction heat and undesirable side-reactions. As diluents or solvents there may be used, e. g., alcohols such as ethanol, butanol or hexanol, aliphatic ethers or ether-alcohols such as isopropyl ether or methoxybutanol, hydrocarbons such as toluene, hexane, etc.

Inasmuch as the reaction involves condensation of one mole of the aldehyde with one mole of the allyl cyanoacetate, stoichiometric proportions of these reactants are advantageously employed. However, since any excess of either the aldehyde or the ester may be readily recovered from the final product, the quantity of reactants initially employed is immaterial.

When operating in the presence of a basic catalyst, the reaction is generally somewhat exothermic so that no external heating is necessary to effect condensation. In the absence of a catalyst and when employing some of the less reactive aldehydes, however, it is often advantageous to heat the reaction mixture to moderately elevated temperatures.

The easy condensation of allyl cyanoacetate with benzaldehyde or alkyl derivatives to yield the present allyl benzylidenecyanoacetates is surprising, for while alkyl cyanoacetates are known, in the prior art, to undergo a 1:1 condensation reaction with the production of alkyl benzylidenecyanoacetates, the unsaturated allyl cyanoacetate would be expected to give with aldehydes unresolvable, resinous masses rather than the well-defined, valuable allyl benzylidenecyanoacetates of the present invention.

The present allyl benzylidenecyanoacetates are stable, rather pungent materials which range from clear, limped liquids to waxy or crystalline solids, depending upon the nature of the aldehyde reactant. While the present compounds are useful for a wide variety of commercial and agricultural applications, e. g., as modifying agents in the manufacture of synthetic resins and rubbers, general biological toxicants, etc., they are particularly valuable as herbicidal agents.

Allyl benzylidenecyanoacetate and derivatives thereof having as sole substituents in the aromatic nucleus an alkyl radical of from 1 to 4 carbon atoms are effective herbicides over wide ranges of concentrations. Their effectiveness may be measured by determining the inhibition of root growth as compared to similar untreated plants. The general usefulness of a herbicide may be measured by comparing the concentrations of a herbicide required to produce a certain inhibition of growth on a broad-leafed plant with the concentrations of a herbicide required to produce the same inhibition of growth on a narrow-leafed plant. For evaluation in many laboratories the cucumber has been adopted as a typical broad-leafed dicotyledonous plant for technical reasons, and wheat has been used as a standard narrow-leafed monocotyledonous plant. The general technique of evaluation of herbicides by growing seedlings in petro dishes has been described by Thompson, Swanson and Norman, Botanical Gazette, 107, 476–507 (1946).

The present invention is illustrated, but not limited, by the following examples:

*Example 1*

A mixture consisting of 22 g. (0.21 mole) of benzaldehyde, 26 g. (0.21 mole) of allyl cyanoacetate, 1 g. of sodium acetate and 150 ml. of 60% ethanol was allowed to stand for about 16 hours. At the end of that time the mixture was distilled to give 21 g. (47.5% theoretical yield) of the substantially pure allyl benzylidenecyanoacetate, B. P. 198–200° C./2 mm., $n_D^{25}$ 1.5864, and analyzing as follows:

|  | Calcd. for $C_{13}H_{12}O_2N$ | Found |
|---|---|---|
| Percent C | 73.24 | 73.09 |
| Percent H | 5.17 | 5.24 | ar-Alkyl derivatives of allyl benzylidenecyanoacetate, e. g., allyl 4-ethylbenzylidenecyanoacetate or allyl 2-isopropylbenzylidenecyanoacetate may be obtained by following substantially the same procedure, using the substituted aldehydes, i. e., 4-ethylbenzaldehyde or 2-isopropylbenzaldehyde instead of benzaldehyde.

*Example 2*

The herbicidal activity of allyl benzylidenecyanoacetate and of two standard heribicides, i. e., isopropyl carbanilate and 2,4-dichlorophenoxyacetic acid, was determined by germination of cucumber seeds for 4 days at a temperature of 76° F. in the presence of an aqueous suspension of each compound at a concentration of 100 p. p. m. Seventy-five seeds were used for each test. The results are expressed as per cent length of the primary roots in the presence of the chemical compared with the length of the primary roots of controls which had been germinated in water:

| Compound Tested | Percent Growth at 100 Parts Per Million |
|---|---|
| Allyl benzylidenecyanoacetate | 4 |
| Isopropyl Carbanilate | 14 |
| 2,4-Dichlorophenoxyacetic acid | 6 |

Derivatives of allyl benzylidenecyanoacetate having as sole substituent in the aromatic ring one alkyl radical of from 1 to 4 carbon atoms also possess herbicidal activity.

The herbicidal efficiency of the present allyl benzylidenecyanoacetates is remarkable, because as shown in the table given below neither allyl compounds generally, nor cyano compounds generally, possess great herbicidal efficiency. When tested as described above, aqueous suspensions of a random group of such compounds were found to have the following effects:

| Compound Tested | Percent Growth at 100 Parts Per Million |
|---|---|
| Ethyl α-cyano-p-chlorocinnamate | 75 |
| Furfurylidenecyanoacetamide | 85 |
| Allyl cyanide | 95 |
| Methallyl trichloroacetate | 99 |

Herbicidal compositions containing the allyl benzylidenecyanoacetates may be oil solutions or oil emulsions of the ester compound. The oil solutions may be obtained simply by dissolving the allyl cyanoacetate in oil in effective proportions. In most instances, however, it is more expedient to prepare oil concentrates of the allyl ester, which oil concentrates are diluted by the consumer prior to their use. Dilution of the oil concentrates may be effected by preparing oil-in-water emulsions, i. e., by adding a small quantity of the oil concentrate to a large quantity of water. The oil concentrates may also be used for the preparation of very dilute oil solutions.

Instead of dissolving the allyl benzylidenecyanoacetates in oil, they may be dissolved in other solvents, and the resulting solutions employed directly as herbicides or employed as concentrates for the preparation of herbicidal aqueous suspensions or dispersions. Solvents which may be used are, e. g., kerosene, hexane, benzene, etc.

Dispersing or emulsifying agents are advantageously employed in the preparation of the present herbicidal suspensions or emulsions.

The allyl benzylidenecyanoacetates are preferably applied by spraying an aqueous suspension or oil emulsion of the same, this method affording an easy and inexpensive way of destroying plant growth. However, they are likewise effective when applied in agricultural dusts; or they may be used with water-insoluble insecticides, fungicides, etc. in customarily employed organic solutions.

The aqueous suspensions or oil emulsions may be used to destroy already existing plant growth by direct application to the undesirable plants, or they may be employed to prevent the plant growth by application to soils. When employed to prevent plant growth, for example in parking areas, highway abutments, railway yards, etc., they may be applied either as liquid sprays or dusts or they may be admixed with customarily employed temporary surfacing materials, e. g., oils, cinders, etc. The present invention thus provides a generally useful method of preventing and destroying undesirable plant growth.

There may be employed 0.1 parts to 20 parts of the allyl benzylidenecyanoacetate compound per hundred parts by weight of the carrier, and in this manner an acre of land may be freed of plants by application of only a few pounds of one of the present herbicides.

What we claim is:

1. Compounds having the general formula

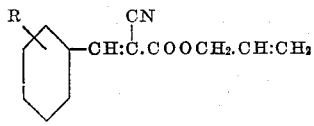

in which R is selected from the class consisting of hydrogen and alkyl radicals of from 1 to 4 carbon atoms.

2. Allyl benzylidenecyanoacetate.

3. The method which comprises contacting allyl cyanoacetate with an aldehyde selected from the class consisting of benzaldehyde and benzaldehyde having one nuclear hydrogen substituted by an alkyl radical of from 1 to 4 carbon atoms and recovering from the reaction product a compound having the general formula

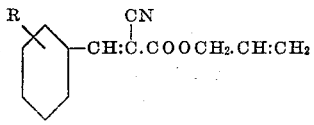

in which R is selected from the class consisting of hydrogen and alkyl radicals of from 1 to 4 carbon atoms.

4. The method defined in claim 3 further characterized in that the allyl cyanoacetate is contacted with the aldehyde in the presence of a basically reacting catalyst.

5. The method which comprises contacting allyl cyanoacetate with benzaldehyde and recovering allyl benzylidenecyanoacetate from the resulting reaction product.

6. The method which comprises contacting allyl cyanoacetate with benzaldehyde in the presence of sodium acetate and recovering allyl benzylidenecyanoacetate from the resulting reaction product.

7. The method of destroying undesirable plants which comprises treating said plants with a toxic quantity of a herbicidal composition containing, as the active ingredient, a compound having the general formula

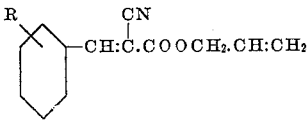

in which R is selected from the class consisting of hydrogen and alkyl radicals of from 1 to 4 carbon atoms.

8. The method of destroying undesirable plants which comprises treating said plants with a toxic quantity of a herbicidal composition comprising a carrier and, as the active ingredient a compound having the general formula

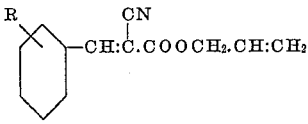

in which R is selected from the class consisting of hydrogen and alkyl radicals of from 1 to 4 carbon atoms.

9. The method of destroying undesirable plants which comprises treating said plants with a toxic quantity of an aqueous suspension of a compound having the general formula

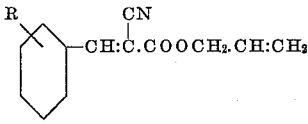

in which R is selected from the class consisting of hydrogen and alkyl radicals of from 1 to 4 carbon atoms.

10. The method of destroying undesirable plants which comprises treating said plants with a toxic quantity of a herbicidal composition containing allyl benzylidenecyanoacetate as the active ingredient.

11. The method of destroying undesirable plants which comprises treating said plants with a toxic quantity of an aqueous suspension of allyl cyanoacetate.

12. The method of destroying undesirable plants which comprises treating said plants with a toxic quantity of a herbicidal composition comprising a carrier and allyl benzylidenecyanoacetate as the active ingredient.

13. A herbicidal composition comprising an aqueous suspension of allyl benzylidenecyanoacetate.

14. A herbicidal composition comprising an oil emulsion of allyl benzylidenecyanoacetate.

15. A herbicidal composition comprising an oil-in-water emulsion of a compound having the formula

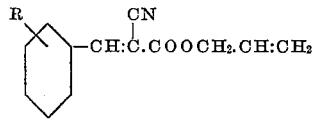

in which R is selected from the class consisting of hydrogen and alkyl radicals of from 1 to 4 carbon atoms.

16. A herbicidal composition comprising an aqueous suspension of a compound having the formula

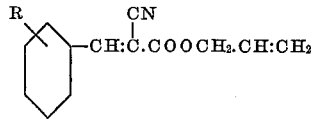

in which R is selected from the class consisting of hydrogen and alkyl radicals of from 1 to 4 carbon atoms.

DAVID T. MOWRY.
ARTHUR H. SCHLESINGER.

References Cited in the file of this patent

UNITED STATES PATENTS

| Number | Name | Date |
|---|---|---|
| 2,398,321 | Mowry | Apr. 9, 1946 |
| 2,446,836 | King | Aug. 10, 1948 |